Oct. 28, 1969   W. W. SWANQUIST   3,474,994
ELECTRICAL BOX MOUNTING CLIP
Filed April 1, 1968   4 Sheets-Sheet 1
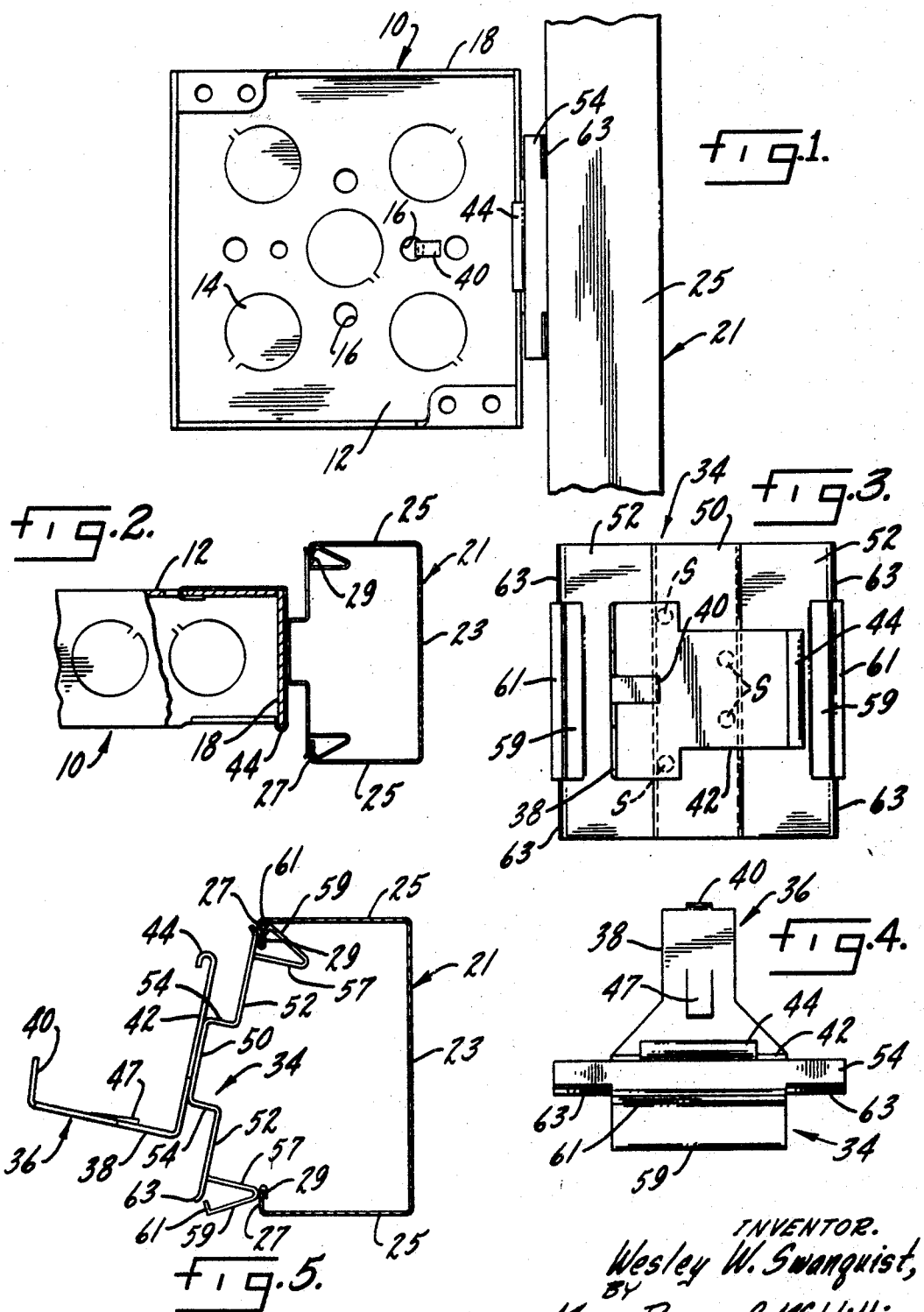
INVENTOR.
Wesley W. Swanquist,
BY
Mann, Brown & McWilliams
Attorneys.

Oct. 28, 1969 W. W. SWANQUIST 3,474,994
ELECTRICAL BOX MOUNTING CLIP
Filed April 1, 1968 4 Sheets-Sheet 2
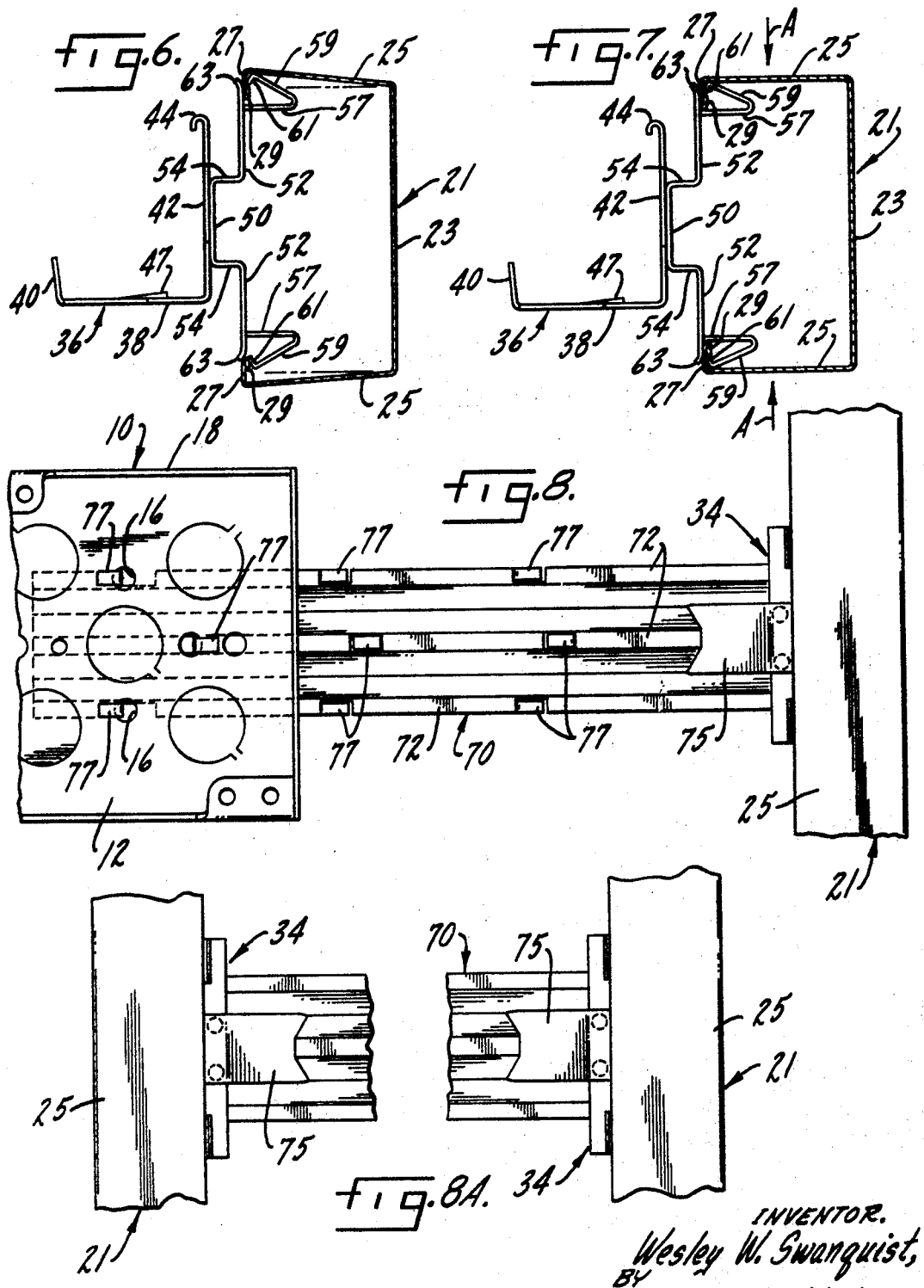
INVENTOR.
Wesley W. Swanquist,
BY
Mann, Brown & McWilliams
Attorneys

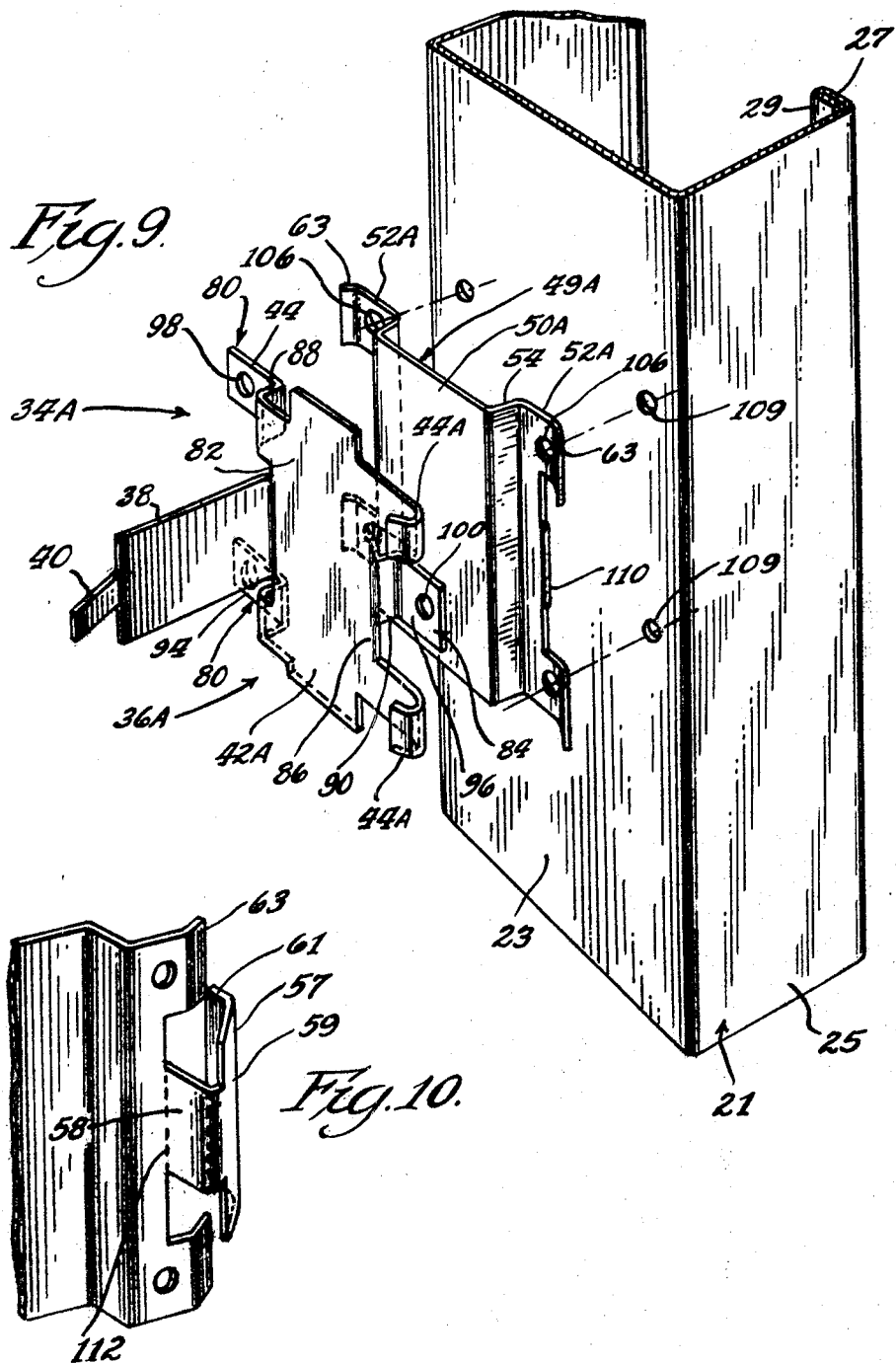

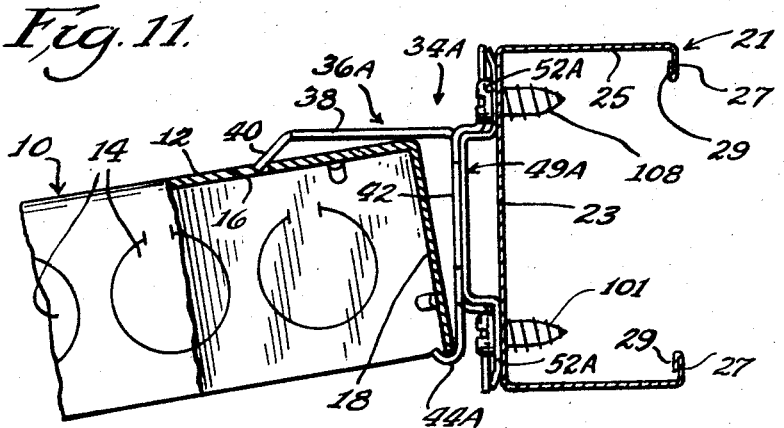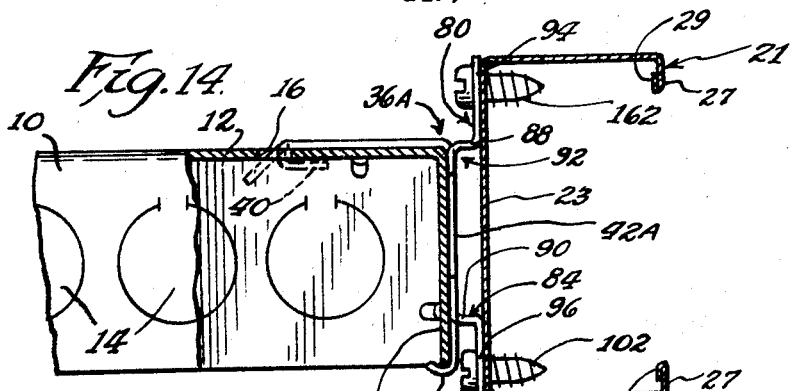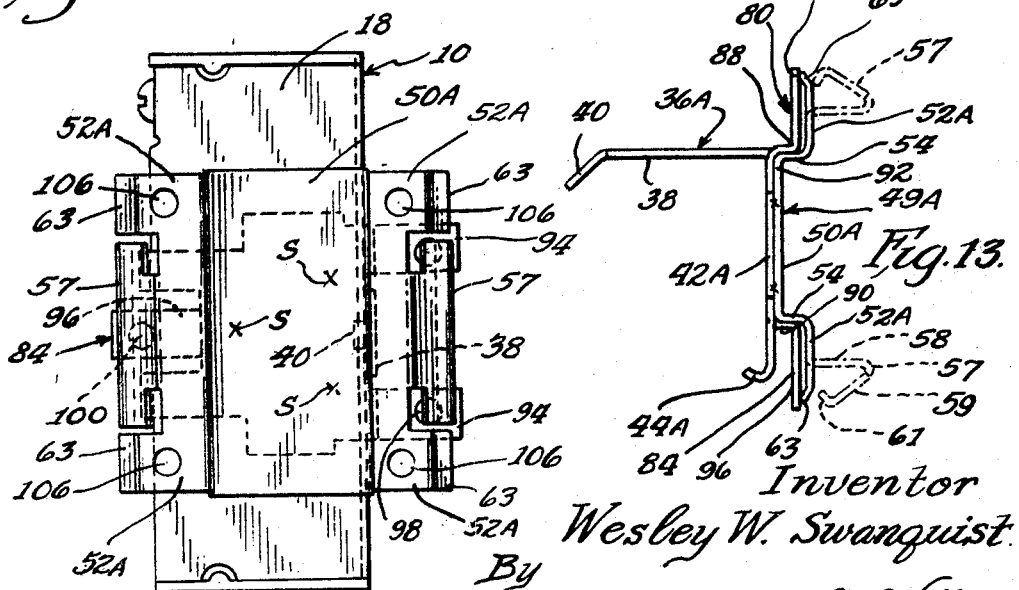

United States Patent Office 3,474,994
Patented Oct. 28, 1969

3,474,994
ELECTRICAL BOX MOUNTING CLIP
Wesley W. Swanquist, Oswego, Ill., assignor to All-Steel Equipment Inc., a corporation of Illinois
Continuation-in-part of application Ser. No. 580,102, Sept. 16, 1966. This application Apr. 1, 1968, Ser. No. 723,647
Int. Cl. F21v 21/08
U.S. Cl. 248—205                                    12 Claims

ABSTRACT OF THE DISCLOSURE

The disclosure relates to a clip for providing either "snap-on" or direct application of outlet boxes and the like to metal studding of the channel-shaped cross-sectional configuration type, in which the clip is in the form of a portion adapted for ready securement to the box or the like and a portion adapted for either "snap-on" or direct application to the studding, including a pair of special grippers that cooperate with the stud inturned flanges on the open side of the stud for "snap-on" application, which grippers may be removed to position perforated wings or arms in abutting relation to the back or web of the stud for securing thereto by employing suitable self tapping screws. In the forms disclosed, the box or the like is applied directly to the clip, or to a strut that is fixed to the clip for disposing the box or the like at a position spaced from the stud that supports the clip, and the clip is in the form of a composite structure including a box engaging member and a stud engaging member, which may be used in combination for the "snap-on" or direct application, or, where desirable, the box engaging member may be employed separately for directly mounting the box on the stud.

---

This application is a continuation-in-part of my application Ser. No. 580,102, filed Sept. 16, 1966, now abandoned (the entire disclosure of which is hereby incorporated herein by this reference).

The present invention relates to the mounting of electrical equipment, and more particularly, to the placement of outlet boxes and like electrical housings in walls of residential and commercial buildings.

Substantial advances have been made in material and building techniques for building up walls in residential and commercial buildings. The use of wallboard supported and backed by metal lath and channel studding has achieved considerable acceptance in the building trade.

It is an object of the present invention to provide improved mountings and methods of using the same for electrical equipment such as outlet boxes and the like which complement the use of metal channel studding by permitting rapid, and greatly simplified, location and placement of such electrical housings.

It is another object of the invention to provide an improved mounting for housings for electrical equipment within the walls of commercial structure which may be located and positioned directly on the studding without the use of any auxiliary tools of any kind.

It is an additional object of the invention, related to the foregoing, to provide such a mounting which is capable of being located and positioned through a minimum access space in a wall which has already been secured in position.

Still another object of the invention is to provide a mounting for housings for electrical equipment which permits ready positioning, without the use of auxiliary tools, in any desired location adjacent to, or in proximity with, a stud, and which provides strength and rigidity.

Additionally, and more specifically, it is an object of the present invention to provide a greatly improved mounting for electrical housings which permits literally snap-in location and placement of such equipment on channel type studding.

Yet a further object of the invention is to provide a highly versatile mounting device for outlet boxes and the like wherein the mounting device can be employed for either "snap-on" application to metal studding, or for direct mounting on such studding or conventional wood studding.

In accordance with my invention, a clip arrangement is provided in which the outlet box or the like is readily attached to the clip by direct application thereto of tabs that embrace same, or by application to a tab bearing strut, with the clip being formed to include special grippers that cooperate with the inturned flanges of metal studding to permit "snap-in place" application to the stud, and wings and tabs provided with screw holes that may alternately be employed to directly mount the box on the stud after removing the grippers.

The foregoing and other objects and advantages of the invention will become apparent from a reading of the following detailed description, when taken in conjunction with the appended drawings wherein like references indicate like parts throughout the several views.

In the drawings:

FIGURE 1 is a side elevation, partially fragmented, of an outlet box mounted in accordance with the invention in the desired position on a familiar form of metal channel stud member showing one form of this invention;

FIGURE 2 is a fragmental top plan view of the embodiment of FIGURE 1, illustrating the relationship between the channel stud and the novel mounting clip of the present invention when employed for "snap-on" application, with the stud shown in section;

FIGURE 3 is an enlarged elevational left side view of the mounting clip of the invention, taken from the left hand side of FIGURE 1, and with the box and stud omitted;

FIGURE 4 is a view of the mounting clip of the present invention viewed from the right of FIGURE 3 and rotated 90 degrees for convenience in illustration;

FIGURES 5, 6 and 7 are views similar to that of FIGURE 2 but illustrate a three step mounting procedure to secure the clip of the present invention to a channel stud member for snap-on application, with the box omitted to facilitate illustration;

FIGURES 8 and 8A are fragmental side elevations of a modified mounting arrangement, illustrating cantilevered and double mounted forms of a strut secured in place by employing the clip of this invention, for spacing the outlet box from the stud member by a predetermined amount;

FIGURE 9 is a diagrammatic exploded perspective view of an alternate form of the basic clip combination of FIGURES 1–7 wherein the clip may be employed to provide the "snap-on" application of FIGURES 1–7 or a direct mount on the back or web of the metal studding, with the clip being shown prepared for a direct mounting application;

FIGURE 10 is a fragmental perspective view of a portion of the studding engaging clip portion of the embodiment of FIGURE 9, illustrating the manner in which the clip snap-on grippers may be removed to permit the direct mounting application;

FIGURE 11 is a view similar to that of FIGURE 2 showing the clip of FIGURE 9 in a direct mount application, with an outlet box shown in the process of being applied thereto;

FIGURE 12 is a side elevational view of the embodiment of FIGURES 9–11 as if taken from the right hand side of FIGURE 11 showing this embodiment of the clip applied to a box to provide the snap-on application of FIGURES 1–8A;

FIGURE 13 is a top or plan view of the clip shown in FIGURES 9–12, with the grippers that have been removed for the direct mount application of FIGURES 9 and 11 being illustrated in dashed lines; and FIGURE 14 is a view similar to that of FIGURE 11 illustrating the box engaging portion of that clip embodiment employed separately to direct mount the box on the stud, in accordance with this invention.

While the invention is thus susceptible of various modifications and alternative constructions, the specific illustrative embodiments that have been shown in the drawings and that are described below in detail have been supplied primarily to comply with the requirements of the patent laws, and it should be understood that the invention is not limited to the specific forms disclosed. The invention is to cover all of the various modifications, alternative constructions and equivalents falling within the spirit and scope of the invention as expressed in the appended claims.

With reference now to the drawings, and particularly to FIGURE 1 thereof, an outlet box 10 is shown and is of well-known construction, having a bottom wall 12, formed with a plurality of knock-outs 14 and holes 16 therein, that is surrounded by an upstanding side wall member 18 to define a box into which light sockets, switches, and other electrical equipment is housed. Such a box is representative of those used in commercial and residential constructions for housing electrical equipment for access thereto from the living area determined by the walls into which the box is mounted. It will be appreciated that while outlet boxes are referred to specifically herein, the term is intended to encompass all comparable housings for electrical equipment.

The present invention is particularly directed to applications wherein the familiar metal channel type of studding, such as upstanding stud 21, is used in the building interior wall construction. Such a stud, as seen in FIGURE 2 conventionally is channel-shaped, having a span, back wall, or web 23 flanked by upstanding sides or side walls 25. The free ends of the sides 25 are inturned, forming opposed flanges 27, and the ends are rolled or folded back as at 29 to thereby define the respective flanges 27 into an inturned flange having a bead thereon.

In keeping with the present invention, a novel mounting clip indicated generally at 34 (FIGURE 3) is provided and adapted to quickly, and without use of additional tools, locate and secure an outlet box, such as that indicated at 10, to a stud of the type indicated at 21.

The clip of the embodiment of FIGURES 1–7 is illustrated in profile particularly in FIGURES 2, 5, 6 and 7. As there shown, the clip 34 comprises two parts or portions 36 and 49 which are joined in any suitable manner, such as by spot welds S (FIGURE 3), to form the singular or unitary device illustrated.

In order to engage the outlet box 10, the clip 34 is provided with a box engaging portion 36 which comprises a base wall portion 38 of suitable sheet steel construction, terminating in a tab 40 at its free end, and having an upstanding wall portion 42 terminating in a hooked end 44 constructed to engage and overlap the upstanding wall 18 of the outlet box 10. Because of the high degree of uniformity in size and location of the knock-outs and holes 14 and 16 in outlet boxes and similar equipment, the clip portion 36 is quite universal in character and capable of readily engaging and securing any standard box such as that illustrated. The tab 40 is suitably located to be aligned with, and inserted through, a hole 16 in the bottom wall of the box. The tab 40 is then readily bent back, as seen in FIGURE 1, to secure the outlet box between the hooked end 44 and the tab 40. In order to provide additional versatility, an auxiliary tab 47 is provided in the bottom wall 38. Thus, between the tabs 40 and 47, engagement with one of the holes provided in the bottom of the outlet box is virtually assured.

The box 10 may be applied to clip portion 36 either before or after the clip 34 is secured to stud 21.

With reference now particularly to FIGURES 3, 4 and 5, the stud engaging portion 49 of the clip 34 will be described in detail. The exemplary stud 21 is of metal fabrication, as heretofore indicated, and the generally accepted uniformity in its specification permits provision of the clip of this invention in a size that will be uniformly applicable to this type of studding, regardless of manufacturing source of the particular studding employed in any given installation The portion 49 of the clip 34 which engages the stud, as illustrated particularly in FIGURE 5, comprises a channel-shaped backing plate member 50, of suitable sheet metal construction of appropriate resilient characteristics oppositely directed flanges in the form of wings 52 extending outwardly from either side of its channel shape defining walls 54. The total wing span of this clip portion transversely of the stud approximates the width of the back wall or web 23 of the stud 21.

The inturned flanges 27 of the channel stud 21 provide advantageous gripping surfaces for the clips, and in order to take advantage of this construction, the invention provides grippers 57, extending outwardly from the wings 52 of the clip portion 50. The grippers 57 are, in accordance with the invention, of a hairpin type construction, having an outwardly extending post or arm portion 58 and an engaging or locking arm portion 59 bent back, and defining, with the outwardly extending arm portion 58, an acute angle of suitable size for the purposes of the invention.

The grippers 57, being formed on resilient metal material, are resiliently flexible to a significant degree, and may therefore be compressed or deformed in an amount far in excess of that actually required to engage the channel in the manner indicated in FIGURE 2, without losing their resiliency or being permanently deformed.

As will be observed in FIGURE 5, the arm portion 59 is provided with an inturned locking end or foot 61, the terminal portion of which resides, when the gripper is in its relaxed state, a very short distance from the terminal end of the wings 52 of the backing member 50. Indeed, the space provided between the two is preferably no more than the thickness of the terminal end portion 27 of the channel-shaped stud, thereby providing ready access of this portion of the stud within the respective grippers with only a minimum of urging pressure required to make such engagement.

Again referring to FIGURE 5, it will be noted that, in order to facilitate insertion of the free end of the channel studding sides 25 within the gripper portion, the clip wings 52 have their end portions 63 bent slightly outwardly and away from the end 61 of the hairpin grippers. This slight bend tends to cam or guide the respective stud flanges 27 into the respective grippers.

FIGURES 5, 6 and 7 graphically illustrate the application of the clip 34 to the channel stud. FIGURE 5 represents the initial position of the clip with respect to the stud in the mounting procedure which, in accordance with the invention, entails insertion of one of the inturned flanges 27 of the channel studding within one of the hairpin grippers 57. This is accomplished by tilting the clip 34 at a suitable angle so as to permit ready insertion of the stud selected flange 27 as seen at the upper part of the stud in FIGURE 5 (with reference to the positioning of the parts as shown in FIGURES 5–7). It will be appreciated, incidentally, that, while an outlet box is not shown in position on the clip in FIGURES 5, 6 and 7, in the usual case, an outlet box would be in that position prior to mounting in the manner described. As seen, the stud flange 27 is readily inserted within the selected hairpin gripper and the end or foot 61 of the gripper portion 58 snaps in behind the terminal portion of the material forming the stud sides 25 that is disposed at the bent back end of edge portion 29 of the steel channel stud flange 27. This arrangement provides an engagement which will later permit a positive locking of the hairpin grippers to the stud. It will also be observed that the other (here shown as the lower) gripper is at or near abutting relation with the other flange portion 27 of the channel stud at or near the terminal end thereof.

Now, with reference to FIGURE 6, the clip 34 is shown in the second stage of its insertion procedure to provide positive gripping engagement with the channel stud. In this figure, it will be noted that the second hairpin gripper arm 59 has been forced into the channel stud past the flange 27. This is possible due to the flexibility of the sidewalls 25 of the channel stud which may be deflected by hand outwardly as may be necessary to dispose the outwardly facing surface of the gripper portion 59 into camming engagement with the adjacent stud flange portion 27 so that the second gripper 57 can be pressed into the space defined by the channel and thus to the position of FIGURE 6. In this position it will be observed that the lower inturned flange 27 resides at the mouth of the hairpin gripper (the space between foot 61 and the adjacent wings 52) and rests between the downturned edges 63 of the wings 52 and the inturned locking end or foot 61, respectively. It will also be observed that the stud side walls 25 have been extended or deflected outwardly from their normal, unflexed position as indicated by the phantom lines shown inwardly of the present position of these side walls.

Because of the flexibility of conventional channel studding of the type illustrated and the novel construction of the clip 34 itself, the only force required on the clip to achieve the position of FIGURE 6 from that illustrated in FIGURE 5, is a slight rotating pressure applied to the clip about the pivot formed at the upper inturned flange portion 27, as a result of the engagement of that portion of the first applied gripper 57. The clip 34 "snaps" into position indicated at FIGURE 6 with complete ease, and, as will be observed, the operation involved requires a minimum of operating space, thereby permitting an outlet box to be positioned and mounted, if necessary, in a wall which has already been constructed with the provision only of a minimum access hole determined by the size of the outlet box and the distance thereof from the channel stud to which it is to be engaged.

The final step in securing the clip to the channel stud results in the positioning illustrated in FIGURE 7, where it will be observed that the stud inturned flanges 27 are locked respectively in the respective hairpin grippers with the locking end portion 61 secured in abutting relationship against the doubled back ends 29 of the channel stud. To achieve this position from that illustrated in FIGURE 6, it is only necessary to provide a squeezing pressure against the stud in the directions indicated by the arrows A. This is accomplished manually by simply squeezing the side walls 25 of the channel stud, thereby snapping the lower inturned flange 27 into position within its associated gripper of the clip to the secured position illustrated. Once this position has been reached, both the inturned flanges 29 are pinched between the abutment surfaces defined by the clip wings 52 and the slightly inwardly flexed locking ends 61 of the respective hairpin grippers, thereby positioning the box in the exact desired location without the use of any auxiliary tools whatsoever.

While considerable gripping force is provided by clip 34, it will be appreciated that comparatively little effort would be required to relocate the box either above or below the engaged position on the stud by simply sliding the clip downwardly along the stud flanges 27 upon which it is engaged, or upwardly, as the case may require. Moreover, the flexibility of the stud side walls 25 is such that removal of the clip may be accomplished with relative ease, and without the use of auxiliary tools. In spite of all of the flexibility provided, the gripping engagement of the clip 34 is satisfactory to meet all building code specifications.

FIGURE 8 is illustrative of a slightly modified form of the invention. There, a mount is provided which permits an outlet box 10 to be located at a position which is outwardly from the stud 21 to which it is secured. This is accomplished, in accordance with the present invention, by providing a cantilever strut 70 of any suitable construction. As illustrated, the strut is formed with reinforcing ribs 72 which provide the needed strength to carry the vertical loads to which the strut 70 will be subjected. At one end of the strut 70 there is provided the needed strength to carry the vertical loads to which the strut 70 will be subjected. At one end of the strut 70 there is provided, in keeping with this aspect of the invention, a clip 34 of substantially identical construction to that discussed in detail hereinabove. Thus, a clip 34 is provided for engagement with the stud 21 in the identical manner described. The clip is suitably supported at one end of the strut by use of spot welding or any other suitable technique, and in order to provide lateral support, a triangulating support member 75 extends at a suitable acute angle between the cantilever strut and the vertical or upstanding wall 54 of the clip 34.

In order to provide universal location of the outlet box 10, a number of suitably spaced tabs 77 are provided at convenient intervals along the strut. The tabs are so positioned that they are readily engaged in holes 16 provided in the outlet box 10 and thereby permit the outlet box to be positioned at any location along the strut itself.

It will also be appreciated that a clip of the type indicated at 34 may be readily provided at both ends of the cantilevered strut which, in such a case, would be of such a length as to span between adjacent channel studs in a wall (see FIGURE 8A) with the clips 34 of the strut 70 being secured to the respective studs involved, which should thus be disposed so their open sides face each other. Such an arrangement provides a more rigid brace upon which to mount the outlet box or boxes where such rigidity is required. An additional advantage to such a construction is that the span would provide additional bracing for the channel studding within the wall.

Still another attribute of the clip of the present invention is that it is readily stamped and formed from available sheet steel or other metal materials. By forming the two portions of the clip 34 in this manner, a relatively simple spot welding operation is the only operation required to complete the manufacture of the clip. The clip in its finished form, therefore, is inexpensive of manufacture, an attribute which further enhances its great utility.

Referring now to the embodiment of FIGURES 9–13, the clip 34A generally comprises box engaging portion 36A and stud engaging portion 49A that are in general arranged similarly to the corresponding portions 36 and 49 of clip 34, but which are modified so that if desired a direct mount application of the clip to the stud is available for securing the outlet box or the like in place in either the manner suggested in FIGURE 11 or the manner suggested in FIGURE 14, with the clip in both instances being applied to the back wall 23 of the stud.

The portion 36A of clip 34A comprises the aforedescribed base portion 38 that terminates in the tab 40 at its free end, and has upstanding wall portion 42A at its other end which in turn terminates in a spaced pair of hooked end portions 44A at its end 86 that are constructed similarly to the hooked end 44 to engage the wall 18 of an outlet box 10 or the like in the manner described in connection with the clip 34.

The clip portion 36A also includes a pair of tabs or fingers 80 that project from the end 82 of wall portion 42A, and an oppositely projecting tab or finger 84 that projects from the other end 86 of the wall portion 42A between hooked end portions 44A.

The tabs or fingers 80 and 84 are angled as at 88 and 90, respectively, to define a channel-shaped configuration that complements that of clip portion 49A (see FIGURES 11 and 13) and disposes the feet portions 94 and 96 thereof in a common plane that is parallel to the plane of wall portion 42A.

The feet or end portions 94 and 96 respectively of the respective fingers or tabs 80 and 84 are formed with perforations 98 and 100, respectively, to receive self tapping screws, such as those indicated at 102 in FIGURE 14.

As indicated by FIGURE 14, I prefer to make the box engaging clip portion 36A of clip 34A in the manner indicated so that, if desired, the clip portion 36A may be used by itself as a box mounting implement, and for this purpose, the clip portion 36A is secured to the back wall or web 23 of the stud by employing the screws 102 to secure same in the position shown, with the starting holes for the screws 102 being formed in any suitable manner. After the clip portion 36A is secured in place in the manner indicated in FIGURE 14, the box 10 or the like is applied thereto to lodge its wall 18 under the hooked end portions 44A and dispose tab 40 within the box through suitable opening 16, similar to the manner in which the box 10 is applied to the clip 34 as has already been described.

The stud engaging portion 49A of clip 34 comprises the channel-shaped backing plate member 50A, which is generally similar to the corresponding member 50 of clip 34 including grippers 57, as indicated by corresponding reference numerals, except that the wings 52A are each formed with a perforation 106 for receiving self tapping screws of the type indicated at 108 in FIGURE 11. The backing member 50A is affixed to the clip box engaging portion 36A in the same manner as described in connection with the clip 34, the parts, when employed together being fixed together by spot welding or the like as indicated at S (see FIGURE 12).

In this embodiment of the invention, the clip 34A comprising the portions 36A and 49A assembled as described is adapted to either provide the snap on type mounting arrangement illustrated in FIGURES 1-8A of the drawings, by employing the grippers 57 for this purpose, in the manner that has already been described, or alternately, the grippers are deleted from the stud engaging portion 49A by severing same from backing plate member 50A, as where indicated at 110 of FIGURE 9, and then applying the wings 52A to the back wall or web 23 of the channel and securing them in place by employing the screws 108 that are turned into appropriately formed and positioned holes 109 formed in the stud.

In accomplishing this arrangement, the grippers may be severed from the backing member 50A as by bending them back and forth with a pair of pliers or the like so that they break off approximately where indicated at 110 of FIGURE 9, and for this purpose, the gripper wall portions 58 may be scored or otherwise formed as at 112 (see FIGURE 10) to facilitate detachment of the grippers from the backing member 50A.

In applying clip 34A in this manner, it is preferable that the box 10 be secured thereto after the clip 34A is mounted in position in the manner indicated in FIGURE 11 so that the screws 108 may be readily applied to the wings 52A at both sides of the stud engaging portion 49A.

The foregoing description and the drawings are given merely to explain and illustrate my invention and the invention is not to be limited thereto, since those skilled in the art who have my disclosure before them will be able to make modifications and variations therein without departing from the scope of the invention.

I claim:

1. A snap-on clip for use in attaching an outlet box or the like to a channel-shaped stud of the type having side walls extending outwardly from a cross wall and terminating in an inturned flange, said clip comprising: a portion adapted to engage the box or the like when the clip is to be secured to the box or the like, and a portion adapted to engage the stud when the clip is to be secured to the stud, said stud engaging portion comprising a backing plate, U-shaped grippers each mounted on said backing plate and extending outwardly therefrom, and defining with said backing plate an opening for receipt of the flanged end of the stud, said grippers permitting pinching engagement of the flanged portions with said backing plate for securing said clip to said stud, said grippers each comprising a post secured to said backing plate inwardly of the end thereof, and a locking portion extending toward said end of said backing plate, said locking portion being resiliently deformable to permit insertion of a portion of said stud between the free end thereof and said backing plate so as to engage the same with a pinching action, with the ends of said backing plate being bent away from the end of said locking portions to facilitate insertion of a portion of said stud therebetween, and the free end of said locking portion being inturned, said box engaging portion comprising an upstanding wall portion, and having an end thereof hooked to engage the wall of the box or the like when the clip is to be secured to the box or the like, the other end of said wall portion comprising an outwardly extending tongue for engagement with the bottom of the box or the like when the clip is to be secured to the box or the like, and having a tab thereon for insertion in a hole in the box or the like to secure the same to said box engaging portion when the clip is to be secured to the box or the like.

2. A snap-on clip for use in attaching an outlet box or the like to a channel-shaped stud of the type having side walls extending outwardly from a cross wall and terminating in an inturned flange, said clip comprising: a portion adapted to engage the box or the like when the clip is to be secured to the box or the like, and a portion adapted to engage the stud when the clip is to be secured to the stud, said stud engaging portion comprising a backing plate, U-shaped grippers each mounted on said backing plate and extending outwardly therefrom, and defining with said backing plate an opening for receipt of the flanged end of the stud, said grippers permitting pinching engagement of the flanged portions with said backing plate for securing said clip to said stud, said grippers each comprising a post secured to said backing plate inwardly of the end thereof, and a locking portion extending toward said end of said backing plate, said locking portion being resiliently deformable to permit insertion of a portion of said stud between the free end thereof and said backing plate so as to engage the same with a pinching action, with the ends of said backing plate being bent away from the end of said locking portions to facilitate insertion of a portion of said stud therebetween, and the free end of said locking portion being inturned, said backing plate being channel-shaped, and being provided with resilient winged portions extending outwardly therefrom, and said grippers being respectively secured to said respective winged portions.

3. The clip as set forth in claim 2 wherein said openings are spaced from one another by an amount greater than the width of the stud, and said locking portions slope toward said openings so as to guide and flex the walls of the stud outwardly when the clip is to be secured to the stud.

4. The clip as set forth in claim 3 in combination with the stud wherein the walls of the stud each terminate in an inturned flange, said stud flanges each having a portion thereof doubled back to define an abutment surface forming edge, and wherein said inturned end of the respective gripper locking portions engages said edge when said clip is secured to said stud.

5. The apparatus as set forth in claim 2 wherein said box engaging portion comprises an elongated member extending outwardly from said backing plate, said elongated member having bendable tabs thereon for insertion into holes in the bottom of the box or the like to secure the same thereto.

6. The apparatus as set forth in claim 5 wherein a duplicate of said clip is secured at the other end of said elongated member.

7. For use in securing an outlet box or the like to a stud of channel-shaped transverse cross-sectional configuration defining a web flanked by side walls extending in the same direction laterally thereof and having the free end of the side walls turned toward each other to define inturned flanges, with the portion of the respective side walls defining said ends being doubled over inwardly of the stud to dispose the terminus of the respective side walls under the respective inturned flanges and facing in opposite directions, a clip comprising:
a backing member defining abutment surfaces along two opposed edges thereof on one side thereof proportioned to engage against the stud inturned flanges when the clip is applied to the stud,
a pair of grippers carried by said backing member and projecting from said one side thereof,
said grippers being disposed adjacent the respective said opposed edges of said member,
and means for securing the clip to the box or the like,
said grippers each comprising an arm portion extending toward the said member edge adjacent same and terminating in an angled foot projecting inwardly of said edges,
said arm portions of the respective grippers being proportioned to define between same at their respective feet and the respective abutment surfaces a narrow space therebetween to slidingly receive therebetween the respective inturned flanges of the respective stud side walls, with the said foot of the respective grippers being disposed to be received behind said terminus of the respective stud side walls in locking relation therewith when the clip is applied to the stud to dispose the inturned flanges thereof in said grippers, respectively, with said grippers extending toward the stud webs and said abutment surfaces engaging the respective stud inturned flanges.

8. The clip set forth in claim 7 wherein:
each of said arm portions is formed to ride over the stud respective inturned flanges when one of the inturned flanges is inserted in one of the grippers to dispose said foot thereof in locking relation therewith and the stud side walls are deflected outwardly thereof to permit the other of said grippers to be inserted between the stud side wall, whereupon said foot of the other of said grippers may be placed in said locking relation with the stud other inturned flange by pressing the stud side walls toward each other.

9. For use in securing an outlet box or the like to a stud of channel-shaped transverse cross-sectional configuration defining a web flanked by side walls extending in the same direction laterally thereof and having the free ends of the side walls turned toward each other to define inturned flanges, with the portion of the respective side walls defining said ends being doubled over inwardly of the stud to dispose the terminus of the respective side walls under the respective inturned flanges and facing in opposite directions, a clip comprising:
a backing member defining wing portions on two opposed edges thereof formed to define abutment surfaces on one side of said member proportioned to bear against the stud inturned flanges when the clip is applied to the stud,
a gripper carried by said backing member adjacent each of said edges and each gripper defining a generally U-shaped arm configuration projecting from said one side of said member and having one leg portion thereof spaced from the plane of said surface adjacent the corresponding edge of said member and the other leg portion connected to said member inwardly of the respective edges,
and means for securing the clip to the box or the like,
said one leg portion of the respective grippers including an angled foot projecting inwardly of the respective member edges and proportioned to define a narrow space between same and said plane to slidingly receive therebetween the respective inturned flanges of the respective stud side walls, with said foot of the respective grippers being disposed to engage said terminus of the respective stud side walls when the clip is applied to the stud to dispose the inturned flanges in said grippers with said grippers extending toward the stud webs and said abutment surfaces engaging the respective stud inturned flanges.

10. The clip set forth in claim 9 wherein:
said grippers are detachable from said clip,
and said wings are formed with holes for receiving screws to direct mount the box on the web of the stud with said abutment surfaces bearing against the stud web.

11. The clip set forth in claim 9 wherein said means for securing the clip to the box or the like comprises:
a base portion terminating in a tab at one end thereof adapted for application to a hole in the bottom wall of the box or the like when the clip is to be secured thereto, and merging at the other end thereof into one end of an upstanding wall adapted to engage the side wall of the box or the like when the clip is to be secured thereto,
said upstanding wall at the other end thereof being hooked to be received over the edge of the box side wall when the clip is to be secured to the box,
said backing member being channel-shaped in configuration in transverse section with said wing portions extending outwardly thereof in substantial parallelism to said backing member,
and means for securing said clip backing member to said base portion upstanding wall.

12. The clip set forth in claim 11 wherein:
said base portion upstanding wall at said end thereof includes outwardly extending wings in substantial parallelism with said upstanding wall and is shaped to complement the channel-shape of said backing member,
said base portion upstanding wall wings being formed with screw holes for direct mounting of said base portion to the stud with said wings thereof being secured to the stud web when same is secured to the stud,
whereby said base portion and its said upstanding wall may be employed with said backing member and said grippers omitted to secure the box or the like to the stud web.

(References on following page)

References Cited

UNITED STATES PATENTS

| | | | |
|---|---|---|---|
| 1,930,242 | 10/1933 | Lademann | 248—205 |
| 2,429,443 | 10/1947 | Yeschick | 248—27 |
| 2,459,953 | 1/1949 | Mills | 287—189.35 |
| 2,537,928 | 1/1951 | Churchill | 248—228 X |
| 2,703,662 | 3/1955 | Meyer | 220—306 |
| 3,101,922 | 8/1963 | Moody et al. | 248—229 X |
| 3,360,151 | 12/1967 | Yznaga | 220—3.9 |
| 3,376,005 | 4/1968 | Swanquist | 220—3.9 |

ROY D. FRAZIER, Primary Examiner

J. F. FOSS, Assistant Examiner

U.S. Cl. X.R.

220—3.9; 248—72, 228